June 24, 1930.  F. W. KRAUSE ET AL  1,768,078
CABLE WINDING DRUM
Filed March 14, 1928   2 Sheets-Sheet 1
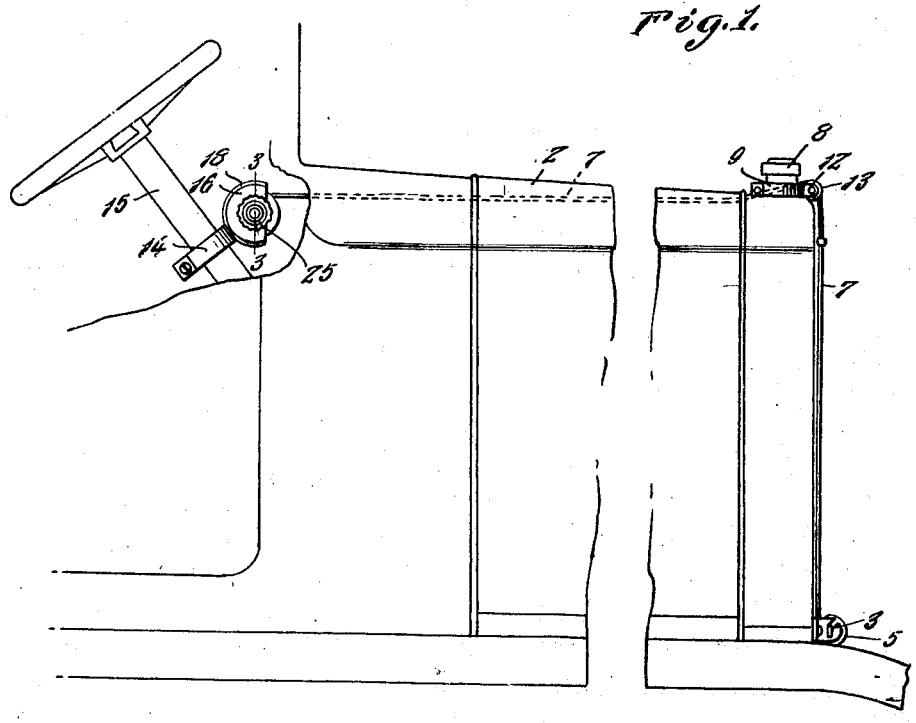
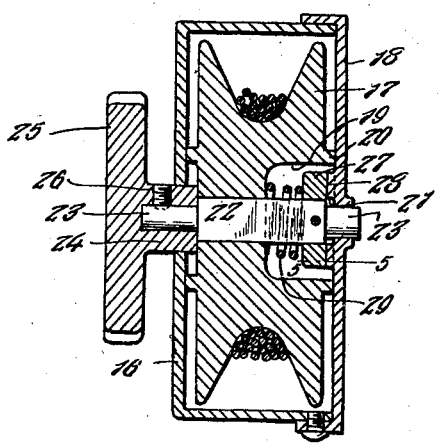
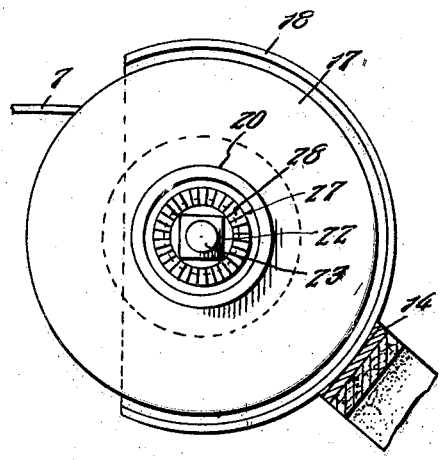
F. W. Krause
H. A. Baechtel
INVENTORS
BY Victor J. Evans
ATTORNEY June 24, 1930.  F. W. KRAUSE ET AL  1,768,078
CABLE WINDING DRUM
Filed March 14, 1928  2 Sheets-Sheet 2
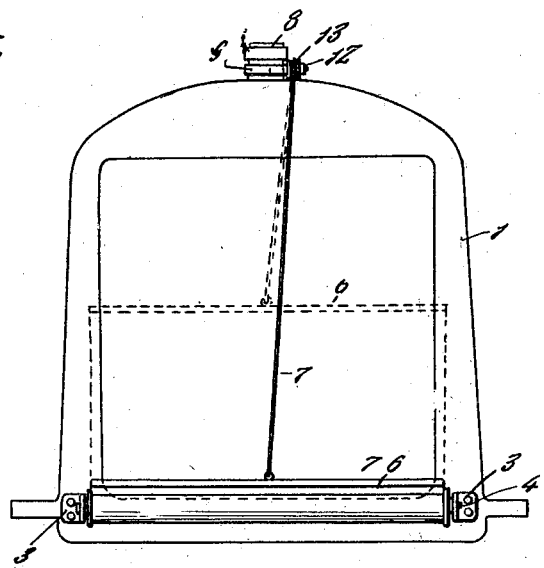
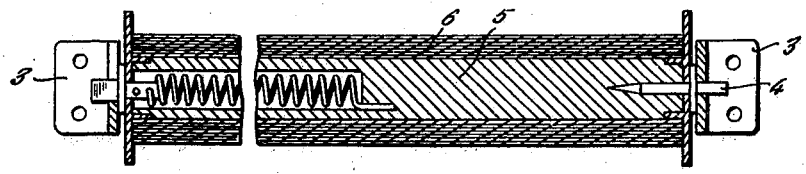
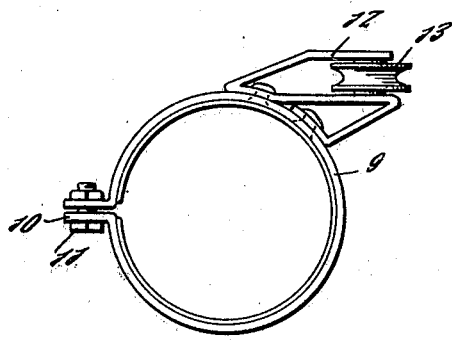
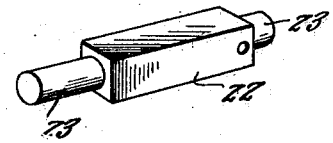
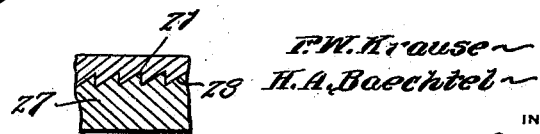

Patented June 24, 1930

1,768,078

UNITED STATES PATENT OFFICE

FRED WM. KRAUSE AND HENRY A. BAECHTEL, OF NATRONA, PENNSYLVANIA

CABLE-WINDING DRUM

Application filed March 14, 1928. Serial No. 261,650.

Primarily our present invention has reference to an automobile radiator protector. Specifically the invention consists in a drum for winding a curtain protector for automobile radiators and our object is the provision of a cable winding drum that may be detachably fixed on the steering post column of an automobile and operated by the driver to wind or permit of the unwinding of the curtain protector.

To the attainment of the foregoing the invention consists in the improvement hereinafter described and definitely claimed.

In the drawings:

Figure 1 is a side elevation of a sufficient portion of an automobile to illustrate the application of our improvement thereon, parts being in section.

Figure 2 is an elevation looking toward the front of the radiator.

Figure 3 is a sectional view approximately on the line 3—3 of Figure 1, upon an enlarged scale.

Figure 4 is a side elevation of the drum with the cap therefor removed.

Figure 5 is a detail sectional view approximately on the line 5—5 of Figure 3.

Figure 6 is a perspective view of the shaft for the drum.

Figure 7 is an approximately central longitudinal sectional view through the curtain carrying roller and the bracket supports therefor.

Figure 8 is a top plan view of the filler spout for the radiator, to illustrate the cable guide arranged thereon.

At the bottom and on the sides of the radiator 1 of an automobile 2 we rivet or otherwise fixedly secure brackets 3. These brackets have journaled therein the pintles 4 of a spring wound curtain carrying roller 5. The roller is removably associated with the brackets and the curtain which is wound on the roller is for distinction indicated by the numeral 6.

The top or outer edge of the improvement is preferably reinforced and has centrally secured thereon an eye to which is attached a cable 7. This cable is directed over the hood of the automobile and through a suitable opening in the frame for the windshield of the machine. To properly direct the cable we arrange around the filler spout 8 for the radiator 1 a split metal band 9. The ends of this band have extensions in the nature of straight ears 10, and passing through these ears there are suitable compressing means 11, such for instance, as a bolt which is engaged by a nut and whereby the split band is held in frictional engagement with the spout 8. On the band 9 there is riveted or otherwise secured a bracket 12, having outer spaced arms and journaled in bearing openings between these arms there is the shaft or trunnions of a grooved wheel 13 over which the cable 7 is directed.

A split band 14, substantially similar to the band 9, is clamped on the steering post 15 of the automobile. This band has secured thereto a substantially circular casing 16 for a drum 17. One face of the casing 16 is open, and this face is closed by a flanged cap member 18, the latter being bolted or otherwise secured to the casing. The outer face of the casing and preferably the cap 18 thereof is open so that the cable 7 may be received in the groove of the drum 17 and the end of the cable secured to the said drum.

The drum, at the side thereof opposite the cap 18 is centrally depressed, as at 19, and the sides of the drum, in a line with the walls provided by the annular depression are formed with circular ribs 20 designed to contact respectively with the inner face of the cap 18 and with the inner side wall of the casing 16. The cap 18, at the central portion thereof is formed with an inwardly extending annular enlargement or boss provided with radially arranged teeth 21.

Received through a squared opening in the center of the drum 17 there is the squared portion 22 of the shaft for the drum. The ends of the shaft are rounded, as at 23, and 24, respectively, the end 23 passing through a bearing opening in the cap 18 and the end 24 being received in a boss or hub extension 24' on the operating knob or handle 25 for the drum. A binding element 26 holds the boss or hub 24' and the member 25 on the end 24 of the shaft.

Fixed on the squared portion of the shaft 22 and received in the depression or pocket 19 of the drum there is a disc 27 that has clutch teeth 28 to engage with the teeth 21. A spring 29 is arranged around the shaft 22 and exerts a tension between the clutch disc 27 and the inner wall of the depression or pocket 19, thereby forcing the teeth of the clutch disc into engagement with the teeth 21 of the cap 18.

The operating handle 25 may be in the nature of a wheel having its periphery milled or may be in the nature of a straight handle. Before the drum can be turned it will be necessary for the operator to exert an outward pull on the knob or handle 25 to impart a like movement to the shaft 22 in order to bring the teeth of the clutch disc 27 out of engagement with the teeth 21 of the cap 18. The drum may be now turned to draw the curtain 6 off of the roller 5 and over the face of the radiator, or to permit the spring influenced roller 5 winding the curtain thereon. By this simple arrangement it will be seen that the curtain may be so regulated with respect to the radiator as to insure the proper control of heat for said radiator and for the engine of the automobile as to insure the proper running of the engine under all weather conditions. The device may be readily attached to any make of automobiles and may be easily detached therefrom by simply removing the roller 5 from engagement with the brackets 3, detachaing the split band 9 from the radiator spout 8 and likewise detaching the split band 14 from the steering column 15. The cord or cable 7 may be removed from the curtain and wound on the drum and the parts constituting the invention may be conveniently stored until again required for use or may be arranged to provide a small package for shipment.

While we have herein set forth one satisfactory embodiment of the invention we do not wish to be to be restricted to the precise details of such construction and, therefore, hold ourselves entitled to make such changes therefrom as fairly fall within the scope of what we claim.

Having described the invention, we claim:

A cable winding drum for the purpose set forth, including a two-part casing having a partly open face, removable means connecting the parts of the casing, an annular clutch surface on one part of the casing, a grooved drum in the casing on which the cable is wound and secured, a shaft having a squared portion passing through a squared opening in the drum and having rounded ends, one of which is journaled in one of the parts of the casing, said drum having one of its faces depressed, a clutch disc fixed on the shaft and arranged in said recess, spring means surrounding the shaft and exerting a pressure against the drum and the friction disc to move the latter into engagement with the friction surface in the casing, and an operating handle having a rounded protrusion journaled through the one side of the casing receiving the second rounded end of the shaft thereon and which handle is fixed to said shaft.

In testimony whereof we affix our signatures.

FRED WM. KRAUSE.
HENRY A. BAECHTEL.